Dec. 10, 1968  G. B. FOSTER ET AL  3,416,040

DIGITAL FREQUENCY COMPARATOR HAVING A TRIGGERED REFERENCE

Filed March 25, 1965  4 Sheets-Sheet 3

$E_m$ $e_1$ $e_2$ $e_3$ $e_4$ $e_5$

INVENTOR
GEORGE B. FOSTER—EUGENE R. LUCKA
KENNETH A. OSTRANDER—RICHARD K. PATTERSON, JR
BY
Schmieding & Fultz
ATTORNEYS Dec. 10, 1968  G. B. FOSTER ETAL  3,416,040
DIGITAL FREQUENCY COMPARATOR HAVING A TRIGGERED REFERENCE
Filed March 25, 1965  4 Sheets-Sheet 4

INVENTOR
GEORGE B. FOSTER—EUGENE R. LUCKA
KENNETH A. OSTRANDER—RICHARD K. PATTERSON, JR.
BY
*Schmieding & Sultz*
ATTORNEYS

United States Patent Office 3,416,040
Patented Dec. 10, 1968

3,416,040
DIGITAL FREQUENCY COMPARATOR HAVING A TRIGGERED REFERENCE
George B. Foster and Richard K. Patterson, Jr., Worthington, and Kenneth A. Ostrander and Eugene R. Lucka, Columbus, Ohio, assignors, by mesne assignments, to The Reliance Electric and Engineering Company, Cleveland, Ohio, a corporation of Ohio
Filed Mar. 25, 1965, Ser. No. 442,596
30 Claims. (Cl. 317—147)

ABSTRACT OF THE DISCLOSURE

A frequency comparator adapted to respond to the frequency of an input waveform. The input waveform triggers a timebase circuit including a bistable multivibrator, a saw tooth generator and a triggering amplifier to generate a reference pulse of fixed duration. This is compared with the input waveform period and a period difference signal is generated. The difference signal is further processed to convert it into a signal whose amplitude is representative of the period difference by a pulse stretcher and an integrator. A limit indication is obtained by comparing the integrator output amplitude with a reference amplitude.

---

This invention relates generally to electronic devices and particularly to a fast acting frequency relay which is actuated by minute variations in the frequency of an input signal from a speed-sensitive transducer.

In general the frequency relay of the present invention takes the electrical signal from a speed-sensitive transducer and compares it against the output signal of a signal-triggered standard time-base generator. The frequency determining circuits of the time-base generator are designed such that when the input frequency from the pickup is at the speed at which the relay is to be actuated, the output signal of the time-base generator is a perfect electrical square wave. The two signals are then compared, one against the other, and if the time-base pulse is equal to or longer than the signal pulse, a pulse appears at the output of a coincidence gate: one pulse for every other cycle during which the two signals are equal in frequency. These pulses are then used to actuate a limit sensor and a relay driver, which, in turn, operate a relay to provide the desired speed information.

As a typical application the frequency relay device of the present invention can be used to protect rotating machines such as turbine motors from overspeed damage in the event the turbine motor should become uncoupled from its load. In such application the speed sensitive transducer is coupled to the rotating shaft of the turbine motor such that when the speed of rotation of the machine exceeds a predetermined limit the solenoid of the frequency relay instantaneously actuates to shut off the turbine motor.

It is, therefore, an object of the present invention to provide a novel frequency relay for monitoring speed conditions of rotating machines and the like which relay is characterized by extremely fast reaction to minute sensed frequency variations of only one or two input pulses.

It is another object of the present invention to provide a novel frequency relay that incorporates a high degree of flexibility in that the time base frequency of the device is independent of any fixed frequency determining networks such as are employed in free running type frequency devices. This advantage results from the use of a novel time base generator that includes a standard time constant capacitor that functions over a large range of frequencies and which need only be changed for unusual load applications in the low frequency range. Since no crystals are used in the present device the expense required for changing crystals for different applications is completely eliminated.

It is still another object of the present invention to provide a novel frequency relay characterized by a circuit designed such that the accuracy of the device is not critically a function of pulse amplitude and hence not dependant on close manufacturing tolerances of circuit components such as resistors and capacitors. Hence lower cost circuit components can be used without sacrificing accuracy and without the loss of accuracy under variations in ambient temperatures.

Further objects and advantages of the present invention will be apparent from the following description, reference being had to the accompanying drawings wherein a preferred form of embodiment of the invention is clearly shown.

Referring in detail to the drawings, an electrical signal from a speed sensitive transducer 10 or 14 is picked up either at the high signal input line 20 or the low signal input line 22 and first delivered to a signal preparing amplifier or modified Schmitt trigger indicated generally at 24.

Figure 3:
FIGS. 3 through 14 are graphical illustrations of various signal pulse wave shapes developed by the circuit of FIG. 1.

The wave form of the input signal at point A is shown in FIG. 3 and is delivered to signal preparing amplifier 24 via wire 26 and capacitor C3.

Figure 1:
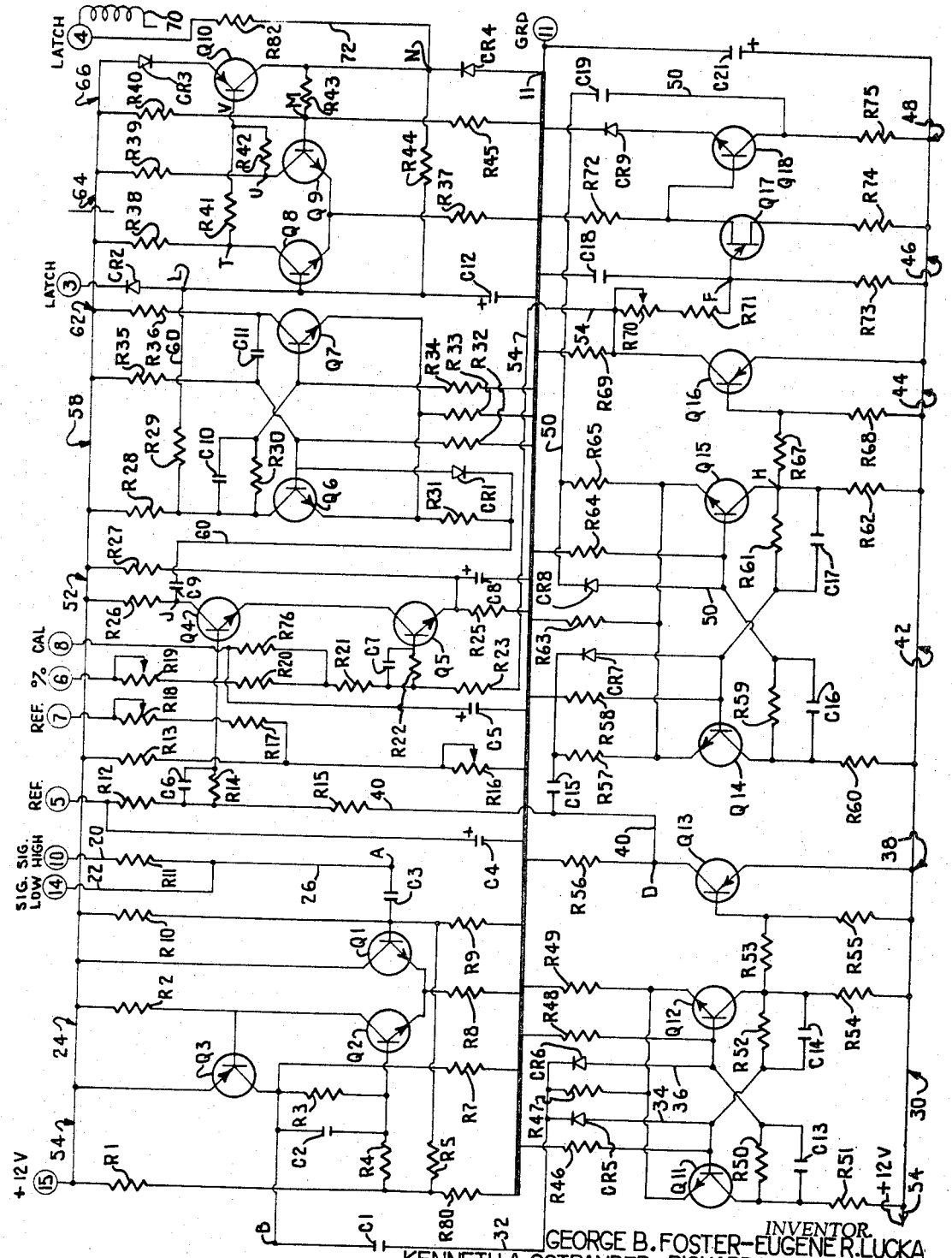
FIG. 1 is a diagrammatic view of a circuit for the frequency relay of the present invention.

Modified Schmitt trigger 24 comprises triodes Q1, Q2, and Q3, the resistances R1 through R9 and capacitors C1 through C3, FIG. 1. This portion of the circuit functions to convert the electrical input signal $Em$ of FIG. 3 to the square wave shape at point B, said square wave shape being designated $e1$ in FIG. 4.

Figure 4:
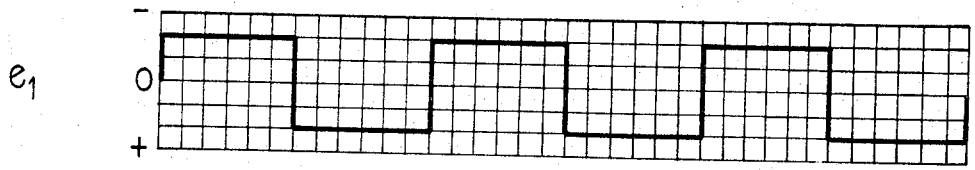

The square wave $e1$ is next used to actuate a bi-stable multivibrator indicated generally at 30 which consists of triodes Q11 and Q12 which through coupling with diodes CR5 and CR6 sees only the negative portion of the pulse $e1$, FIG. 4 from the modified Schmitt trigger 24.

Although the various elements designated by the prefix Q herein such as the elements Q11 and Q12 of the bi-stable multivibrator 30 are referred to generally as triodes herein, it should be pointed out that such elements are preferably in the form of transistors.

It will be noted from FIG. 1 that the square wave signal from Schmitt trigger 24 is fed to triodes Q11 and Q12 via wire 32, diodes CR5, wire 34, diode CR6, and wire 36.

With continued reference to FIG. 1, the bi-stable multivibrator 30 portion of the circuit further includes resistors R46 through R55 and two capacitors C13 and C14.

Figure 5:
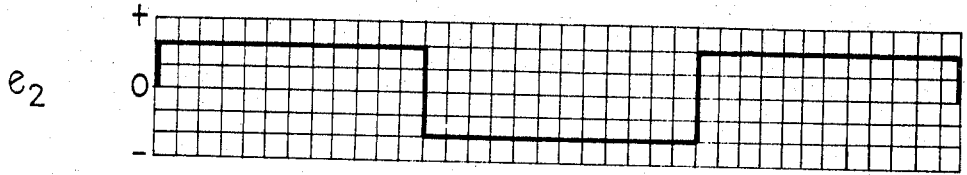

It will now be understood that since bi-stable multivibrator 30 sees only the negative pulse of Schmitt trigger 24, the vibrator therefore changes state only once during each cycle of the Schmitt trigger. Hence, as seen in FIGS. 4 and 5, the output pulse $e2$ from multivibrator 30 is only one-half the frequency of the output pulse $e1$ from Schmitt trigger 24.

Figure 6:
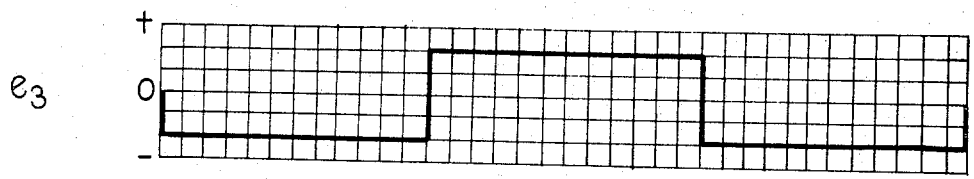

The signal is next presented to a buffer amplifier indicated generally at 38 which comprises a triode Q13 and resistor R36. In passing through buffer amplifier 38 the signal is amplified and its wave shape is inverted as seen at $e3$ in FIG. 6.

Figure 2:
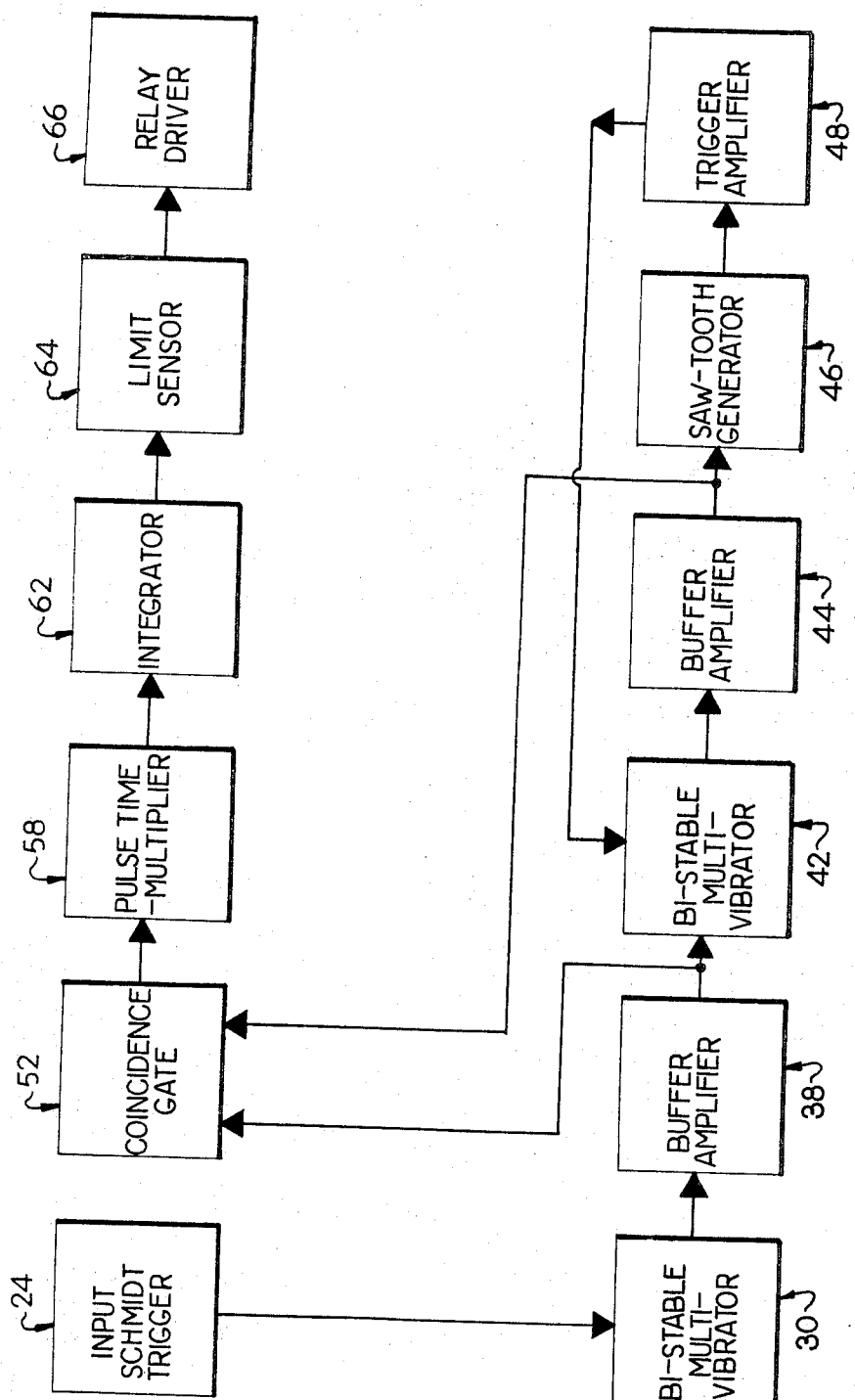
FIG. 2 is a block diagram illustrating various portions of the circuit of FIG. 1.

The amplified and inverted pulse $e3$ is next delivered via a wire 38 and capacitor C15 to a time base generator portion of the circuit which comprises four separately considered circuit portions. As is most clearly seen in the block diagram of FIG. 2 these circuit portions consist of a second bi-stable multivibrator 42, a second buffer amplifier 44, a sawtooth generator 46, and a trigger amplifier 48.

In considering the time base generator reference is first made to the second bi-stable multivibrator portion of the time base generator indicated generally at 42 in FIG. 1. It should be pointed out that multivibrator 42 is turned on or off, depending on resetting state, by the negative portion of the output pulse e3 from buffer amplifier 38 which pulse is delivered to multivibrator 42 via capacitor C15, wire 40, and diode CR7, the latter seeing only the negative portion of the signal pulse e3.

With continued reference to FIG. 1 it will be noted that second bi-stable multivibrator 42 includes triodes Q14 and Q15, resistors R57 through 65, and capacitors C16 and C17.

Figure 8:
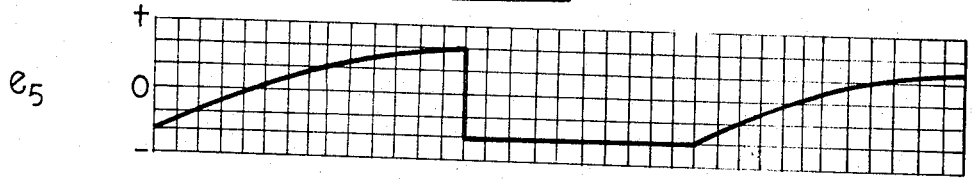
Figure 9:
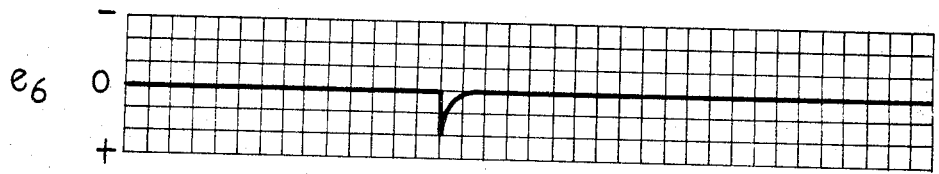

The signal from the second bi-stable multivibrator 42 is then fed through a second buffer amplifier 44 via resistance R67. It will be noted that second buffer amplifier 44 comprises a triode Q16 and resistors R68 and R69. Here again, as in the case of the first buffer amplifier 38, the signal is amplified and inverted and then presented to the previously mentioned sawtooth generator, indicated generally at 46, which consists of a unijunction transistor Q17, a time constant capacitor C18, and a resistance network R69, R70 and R71. The voltage pulse at the time constant capacitor is indicated at e5 in FIG. 8 and it should be pointed out that as soon as the voltage at time constant capacitor C18 reaches the proper level, as determined by the firing characteristics of Q17 in the resistance network, the time constant capacitor C18 will discharge thus gating "on" unijunction transistor Q17. Thus the wave form at point F in the sawtooth generator 46 takes the form of the sawtooth wave shape e5 of FIG. 8 and the output of unijunction transistor Q17 appears as a spike e6 as seen in the wave diagram of FIG. 9.

With continued reference to the time base generator, the last circuit portion comprises a trigger amplifier 48 that consists of a triode Q18, resistor R75, and diode CR9 and functions to amplify the spike wave e6.

The spike e6 is coupled to the previously described second bi-stable multivibrator 42 via a wire 50 and capacitor C19 and functions to reset such second bi-stable multivibrator.

Figure 7:
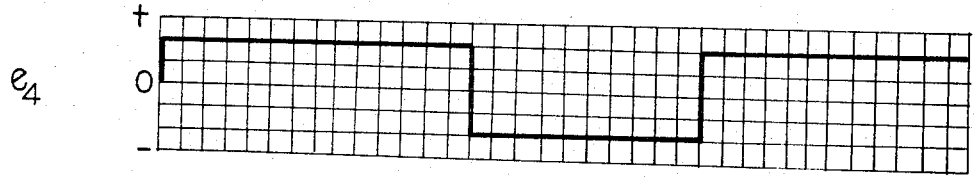

The resultant output wave form from the second bi-stable multivibrator 42 appears as a square wave e4 in FIG. 7 and this pulse is next delivered via wire 54 to one side of a coincidence gate indicated generally at 52.

It should now be pointed out that the resultant output wave form from the time base generator appears as a rectangular wave e4 whose "on time" is a function of the time required for time constant capacitor C18 to reach firing potential and whose "off time" is the time period between the "turn-off" spike signal from trigger amplifier 48 and the next negative pulse from the first buffer amplifier 38.

In addition to the time base signal delivered to one side of the coincidence gate 52 via line 54 it should also at this time be pointed out that the separate input signal pulse e3 from the previously mentioned first buffer amplifier 38 is delivered to the other side of the coincidence gate via wire 40, resistors R14 and R15, and thence to triode Q4. Also, it will be noted from FIG. 1 that the previously mentioned time base signal e4 is delivered to the other side of coincidence gate 52 via line 54, resistors 22 and 23 and thence to the other triode Q5 of the coincidence gate.

As a matter of general discussion, coincidence gate 52 consists of two triode "switches" Q4 and Q5 which are connected in series with a voltage source 54. The gate of triode Q4 is connected to the signal pulse output e3 via wire 40 and the gate of triode Q5 receives the standard time base pulse e4 from the time base generator via wire 54. When both these signal pulses e3 and e4 are positive at the same time both triodes Q4 and Q5 are turned on and remain energized for the time interval in which positive coincidence exists.

Figure 10:
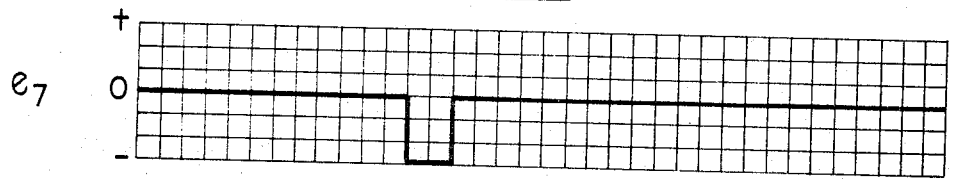

The output pulse of coincidence gate 52 is seen as the wave form e7 of FIG. 10, such signal being released from the coincidence gate at point J of FIG. 1. It will now be understood that the negative pulse e7 is released from the gate when positive coincidence exists between input pulses e3 and e4. Moreover, it can be stated that the output signal pulse e7 from coincidence gate 52 is the sum, with respect to polarity, of the positive input pulses e3 and e4.

With continued reference to the coincidence gate, this portion of the circuit further includes resistors R19, R20, R21, R25, R26, R27, and R76 and capacitors C5, C6, C7, C8, and C9.

Reference is next made to a pulse time multiplier indicated generally at 58 which receives pulses from the previously described coincidence gate 52 via a capacitor C9, wire 60 and diode CR1. Pulse-time multiplier 58 can be thought of as a "pulse stretcher" which functions to produce a pulse of longer time duration. Moreover, pulse-time multiplier 58 is simply a mono-stable multivibrator which fires instantaneously upon receipt of the pulse e7 from the coincidence gate 52 that delays a short time before resetting, said delay being determined by the R-C network consisting of resistors R32 and R35 and capacitor C11. The mono-stable multivibrator circuit 58 further comprises triodes Q6 and Q7, resistors R28 through R36, and capacitors C10 and C11.

Figure 11:
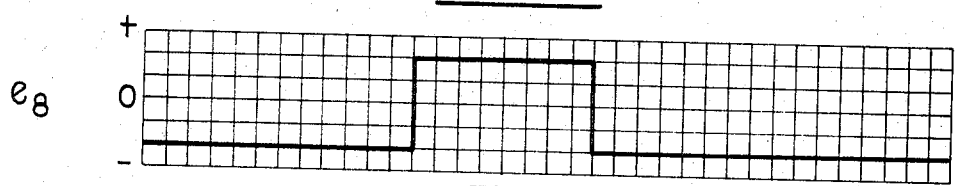
Figure 12:
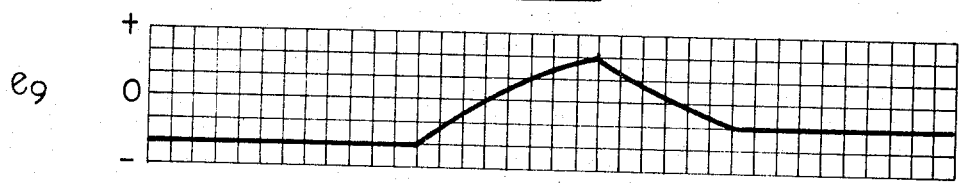
Figure 13:
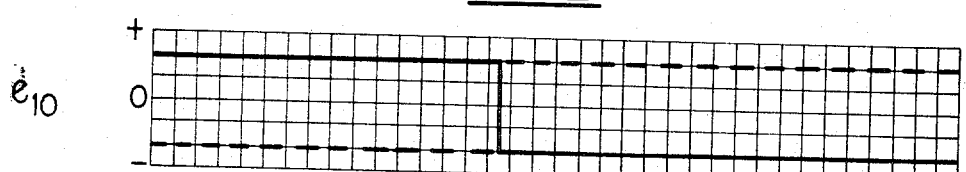
Figure 14:
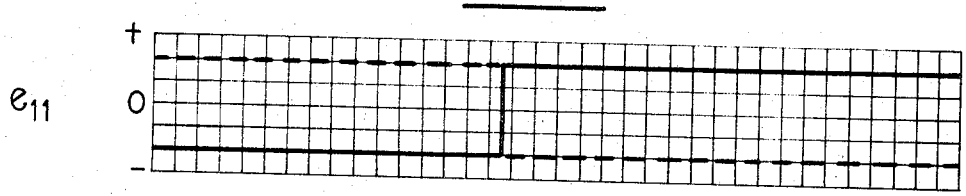

With continued reference to FIG. 1, the output signal e8, FIG. 11, from the pulse-time multiplier, having been increased in time duration with respect to the output e7 from the coincidence gate, is next presented to an integrator via a wire 60 which integrator consists of resistor R29 and capacitor C12, said integrator being indicated generally at 62 on the circuit diagram.

After integration at C12 and R29 the square wave signal e8 is next presented to a limit sensor indicated generally at 64 which comprises triodes Q8 and Q9 and resistances R37, R39, R40, R41, R42, R43, and R44. At this point it should be pointed out that limit sensor 64 has a fixed reference voltage due to its connection with voltage supply 54. Whenever such reference voltage of the limit sensor is exceeded by the direct current output from pulse time multiplier 58 the limit sensor trips.

With further reference to limit sensor 64, it should be pointed out that if a sufficient number of coincidences of positive pulse polarity occur at coincidence 52, the voltage at point L of FIG. 1 will remain above the level required to trip limit sensor 64 and the limit sensor will remain "on." In other words, whenever the reference voltage of the limit sensor 64 is exceeded by the direct current output e9, limit sensor 64 trips and actuates a relay driver indicated generally at 66 which in turn actuates a relay 70 via wire 72.

As seen in FIG. 1 the relay driver 66 consists of a triode Q10 and diode CR3 and CR4.

With reference to FIG. 1, an external volt meter can be connected between the terminals REF. 7 and CAL. 8 and a voltage will appear which corresponds to the frequency of the incoming signal Em, FIG. 3.

An external indicating voltmeter may be connected between "%6" and REF. 5 and a voltage will appear which corresponds to the incoming signal Em, FIG. 3, expressed as a percentage of the limit setting.

Each of the resistances R16, R18 and R19 adjust the circuitry such that it will read correctly when external meters are connected as mentioned above.

The terminals Latch 3 and Latch 4 are provided for latching the relay in the tripped position when these terminals are connected together. Breaking this connection allows the relay to reset to its normal condition.

While the form of embodiment of the present invention as herein disclosed constitutes a preferred form, it is to be understood that other forms might be adopted, all coming within the scope of the claims which follow.

We claim:

1. A frequency comparator for comparing a first frequency with a reference frequency comprising: frequency sensing means for generating an input signal at said first frequency; input circuit means coupled to said frequency sensing means to produce a comparison pulse equal in duration to the input signal period; a timebase generator for producing a reference pulse having a period corresponding to the reference frequency, said timebase generator including a first bistable circuit adapted to be set in a first state in response to the leading edge of said comparison pulse, saw tooth generator means connected to said first bistable circuit and responsive to said first state to produce a saw tooth output waveform, means responsive to said sawtooth waveform to set said bistable circuit in its second state after a predetermined time equal to said reference pulse period; and gating means having as a first input, said comparison pulse, and as a second input, said reference pulse, and being operative to produce a timing pulse, the duration of which is representative of the difference in duration between said reference pulse and said comparison pulse.

2. A frequency comparator as defined in claim 1 wherein said input circuit means comprises a trigger circuit responsive to said input to produce a square wave in frequency synchronism with said input, a further bistable circuit, means for operating said further bistable circuit at one-half the frequency of said square wave; and means coupling said further bistable circuit to said timebase generator.

3. A frequency comparator as defined in claim 2 wherein said means coupling the output of said further bistable circuit to the input of said first bistable circuit is operative to actuate said first bistable circuit in response to successive like polarity transitions of said further bistable circuit output.

4. A frequency comparator as defined in claim 1 wherein said saw tooth generator includes a time constant capacitor; means for charging said capacitor in response to the initiation of said first state of said first bistable circuit; and amplitude sensitive circuit means coupled to said capacitor and operative to discharge said capacitor rapidly whenever said capacitor voltage reaches a predetermined level.

5. A frequency comparator as defined in claim 4 wherein said means for charging said capacitor operates at a rate substantially slower than the discharge rate established by said amplitude sensitive circuit means; and including trigger means responsive to the discharge of said capacitor to establish said first bistable circuit in its second state.

6. A frequency comparator as defined in claim 1 wherein said saw tooth generator includes an energy storage circuit element, means for storing energy therein at a predetermined rate; means responsive to the level of stored energy to remove said energy at a rate substantially more rapid than said storage rate; and means responsive to the removal of said energy to switch said first stable circuit to its second state.

7. A frequency comparator as defined in claim 1 wherein said saw tooth generator includes a time constant circuit for establishing the timebase of said saw tooth waveform; a trigger amplifier connected to the output of said saw tooth generator, the output of said trigger amplifier being coupled to said first bistable circuit to switch said first bistable circuit to its second state when said saw tooth waveform reaches a predetermined level; and means to inhibit the operation of said saw tooth generator when said first bistable circuit is in its second state.

8. A frequency comparator as defined in claim 1 further including actuating means coupled to said gating means to produce an output when said timing pulse reaches a predetermined duration.

9. A frequency comparator as defined in claim 8 wherein said actuating means includes a pulse time multiplier comprising a monostable multivibrator connected to said gating means; said monostable multivibrator being set to its quasi-stable state by said timing pulse from said gating means.

10. A frequency comparator as defined in claim 8 wherein said actuating means includes a pulse time multiplier comprising a monostable multivibrator connected to said gating means, said monostable multivibrator being set to its quasi-stable state by a pulse output from said gating means; and time delay means for delaying the resetting time of said monostable multivibrator.

11. A frequency relay as defined in claim 8 wherein said actuating means includes means responsive to said timing pulse to generate a measurement signal whose amplitude corresponds to the duration of said timing signal; a relay driver; and limit sensing means responsive to the amplitude of said measurement signal to operate said relay driver whenever said measurement signal reaches a predetermined reference level.

12. A frequency comparator as defined in claim 11 wherein said measurement signal generating means includes means coupled to the output of said gating means, operative to generate a measurement pulse in response to each timing signal; means to provide an indication of the frequency of occurrence of said measurement pulses; and a limit sensor to provide an output when said frequency of occurrence of said measurement pulse reaches a predetermined value.

13. A frequency comparator as defined in claim 11 wherein said means to provide said indication of said frequency of occurrence of said measurement pulses comprises an integrator circuit.

14. A frequency comparator as defined in claim 8 wherein said actuating means includes a monostable multivibrator coupled to said gating means and being responsive to said timing pulse to generate a measurement pulse of predetermined duration; integration circuitry coupled to the output of said multivibrator; a limit sensor coupled to the output of said integrator and responsive to a predetermined input signal level to generate an output signal; and relay driver means coupled to said limit sensor and adapted to be actuated in response to said output signal.

15. A frequency comparator as defined in claim 1 including relay actuating means coupled to said gating means and comprising pulse time multiplication means including a monostable multivibrator connected to said gating means, said monostable multivibrator being switched to its quasi-stable state by pulse signals from said gating means; integration means including a resistor and a capacitor coupled to the output of said monostable multivibrator; limit sensor means connected to the output of said integrator means, said limit sensor comprising first and second triodes coupled to a fixed reference voltage and responsive to said integrator output to produce a limit signal when said integrator output reaches said reference voltage, and a relay driver operative in response to said limit signal.

16. A frequency sensitive device adapted to produce an output whenever the frequency of a phenomenon under observation attains a predetermined relationship with a reference frequency comprising: frequency sensing means for producing an input signal having periodic properties representative of the frequency of the phenomenon under observation, an input circuit coupled to said frequency sensing means including means to produce a rectangular pulse signal in frequency synchronism with said input signal, and means responsive to said rectangular pulse signal to produce a comparison pulse of duration corresponding to the input frequency; a timebase generator means triggered in response to said comparison pulse to produce a reference pulse of duration corresponding to said reference frequency; gating means responsive to the output of said timebase generator and to said reference pulse to produce a timing pulse representative of the difference between duration of said reference pulse and said comparison pulse; actuating means comprising means responsive to said timing pulse to produce a measurement pulse having predetermined duration for each of said timing pulses, the frequency of said measurement pulses constituting an indication of the relationship between said input frequency and said reference frequency, and means to provide an amplitude analog of the frequency of said measurement pulses; and means responsive to said amplitude analog to provide an output when said amplitude analog reaches a predetermined value.

17. A frequency sensitive device as defined in claim 16 wherein said input circuit includes a Schmitt trigger having its input coupled to said frequency sensing means; and a bistable multivibrator, said bistable multivibrator being triggered from one state to the other by successive like-polarity transitions of said Schmitt trigger output.

18. A frequency sensitive device as defined in claim 16 wherein said timebase generator comprises a bistable multivibrator adapted to be switched into a first state by the leading edge of said comparison pulse; saw tooth generator means coupled to said bistable multivibrator and responsive to said first state to produce a saw tooth output waveform, means responsive to said saw tooth waveform to switch said bistable multivibrator into its second state after a predetermined time equal to said reference pulse period; and means coupling the output of said bistable multivibrator to said gating means as said reference pulse.

19. A frequency sensitive device as defined in claim 18 wherein said saw tooth generator includes a time constant capacitor; means for charging said capacitor in response to the switching of said bistable multivibrator into said first state; and amplitude sensitive circuit means coupled to said capacitor and operative to discharge said capacitor rapidly whenever said capacitor voltage reaches a predetermined level.

20. A frequency sensitive device as defined in claim 19 wherein said means for charging said capacitor operates at a rate substantially slower than the discharge rate established by said amplitude sensitive circuit means; and including trigger means responsive to the discharge of said capacitor to switch said bistable multivibrator into said second state.

21. A frequency sensitive device as defined in claim 18 wherein said saw tooth generator includes an energy storage circuit element; means for storing energy therein at a predetermined rate; means responsive to a predetermined level of stored energy to remove said energy at a rate substantially more rapid than said storage rate; and means responsive to the removal of said energy to switch said bistable multivibrator to said second state.

22. A frequency sensitive device as defined in claim 18 wherein said saw tooth generator includes a time constant circuit for establishing the timebase of said saw tooth waveform; a trigger amplifier connected to the output of said saw tooth generator, the output of said trigger amplifier being coupled to said bistable multivibrator to switch said bistable multivibrator to said second state when said saw tooth waveform reaches a predetermined level; and means to inhibit the operation of said saw tooth generator when said bistable multivibrator is in said second state.

23. A frequency sensitive device as defined in claim 16 wherein said actuating means includes a pulse time multiplier comprising a monostable multivibrator connected to said gating means; said monostable multivibrator being set to its quasi-stable state by said timing pulse from said gating means.

24. A frequency sensitive device as defined in claim 16 wherein said actuating means includes a pulse time multiplier comprising a monostable multivibrator connected to said gating means, said monostable multivibrator being set to its quasi-stable state by a pulse output from said gating means; and time delay means for delaying the resetting of said monostable multivibrator.

25. A frequency sensitive device as defined in claim 16 wherein said means responsive to said timing pulse to produce a measurement pulse comprises a monostable multivibrator.

26. A frequency sensitive device as defined in claim 25 wherein said means to provide an amplitude analog of the frequency of said measurement pulses comprises an integrator circuit coupled to the output of said monostable multivibrator.

27. A frequency sensitive device as defined in claim 26 wherein said means responsive to said amplitude analog comprises a limit sensor coupled to the output of said integrator and to a fixed reference voltage, and operative to provide its output when the output of said integrator is equal to said reference voltage.

28. A frequency sensitive device as defined in claim 16 wherein said actuating means comprising pulse duration multiplication means including a monostable multivibrator connected to said gating means, said monostable multivibrator being switched to its quasi-stable state by said timing pulses to produce said measurement pulses; integration circuitry including a resistor and a capacitor coupled to said output of said monostable multivibrator; limit sensor means connected to the output of said integration circuitry; said limit sensor means comprising first and second triodes coupled to a fixed reference voltage and responsive to said integrator output to produce a limit signal when said integrator output equals said reference voltage; and a relay driver operative in response to said limit signal.

29. A frequency sensitive device as defined in claim 28 wherein said input circuit means includes a Schmitt trigger coupled to said frequency sensing means; and a first bistable multivibrator; said first bistable multivibrator being triggered from one state to the other by successive like polarity transitions of said Schmitt trigger output.

30. A frequency sensitive device as defined in claim 29 wherein said timebase generator includes a second bistable multivibrator adapted to be switched to a first state in response to the leading edge of the transition of said first multivibrator output to one of its states; sawtooth generator means coupled to said second bistable multivibrator and responsive to said first state to produce a saw tooth output waveform, means responsive to said saw tooth waveform to switch said second bistable multivibrator to its second state after a predetermined time equal to said reference pulse period; and means responsive to said second state to inhibit operation of said saw tooth generator.

References Cited

UNITED STATES PATENTS

| | | | |
|---|---|---|---|
| 2,703,862 | 3/1955 | Gorden | 317—5 X |
| 3,064,189 | 11/1962 | Erickson et al. | 317—5 X |
| 3,084,307 | 4/1963 | Landis | 31— 5 |
| 3,184,606 | 5/1965 | Ovenden et al. | 307—88.5 |
| 3,206,641 | 9/1965 | Lesson et al. | 317—6 |
| 3,346,771 | 10/1967 | Sutton | 317—5 |
| 3,351,811 | 11/1967 | Buckley et al. | 317—5 |

LEE T. HIX, *Primary Examiner.*

J. A. SILVERMAN, *Assistant Examiner.*

U.S. Cl. X.R.

317—5